May 31, 1955  W. GEISLER  2,709,559
DISPOSABLE PALLET
Filed Aug. 17, 1949  2 Sheets-Sheet 1
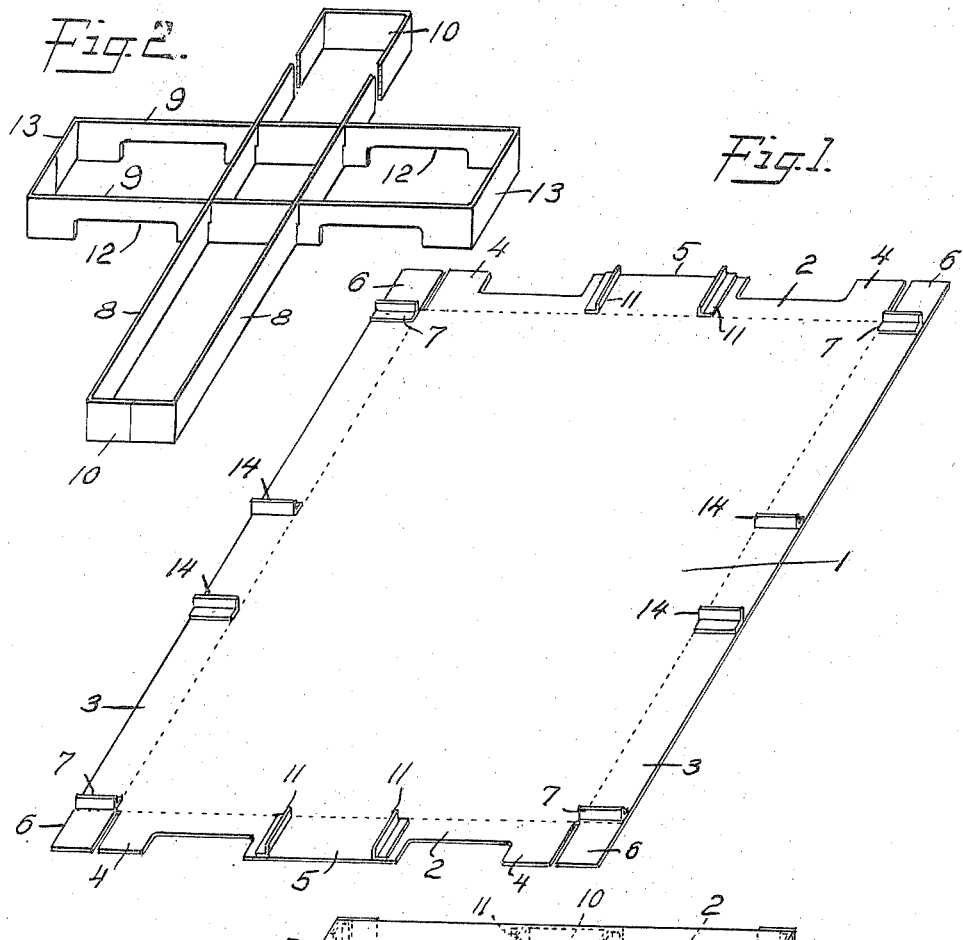
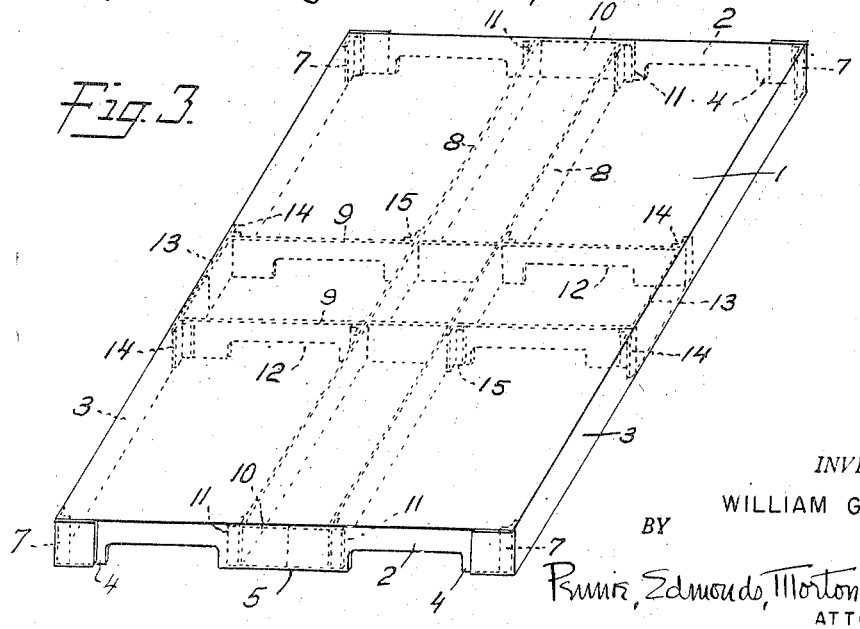
INVENTOR.
WILLIAM GEISLER
BY
Pennie, Edmonds, Morton & Barrows
ATTORNEYS May 31, 1955  W. GEISLER  2,709,559
DISPOSABLE PALLET
Filed Aug. 17, 1949  2 Sheets-Sheet 2
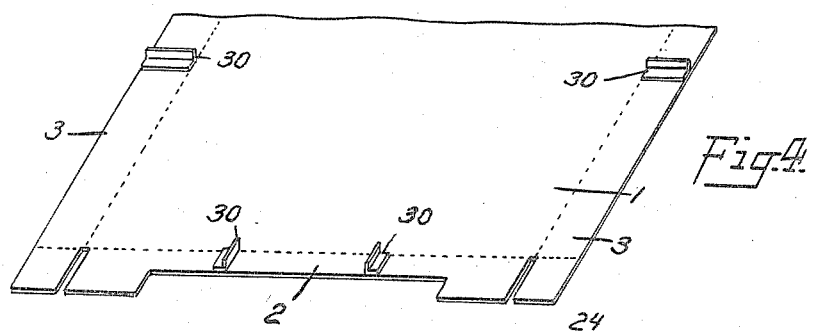
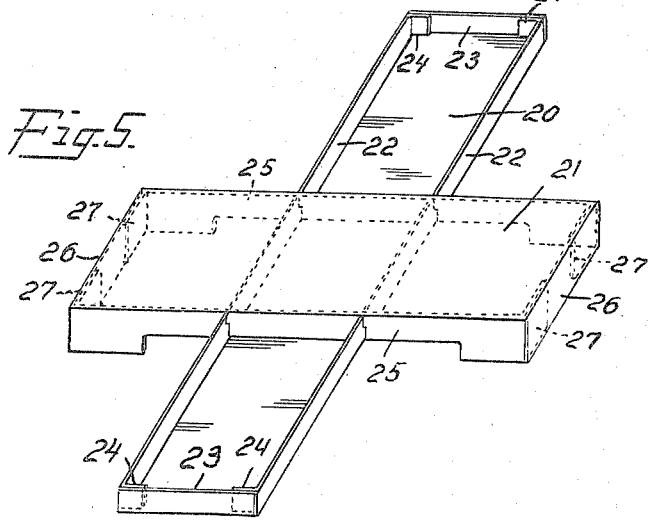
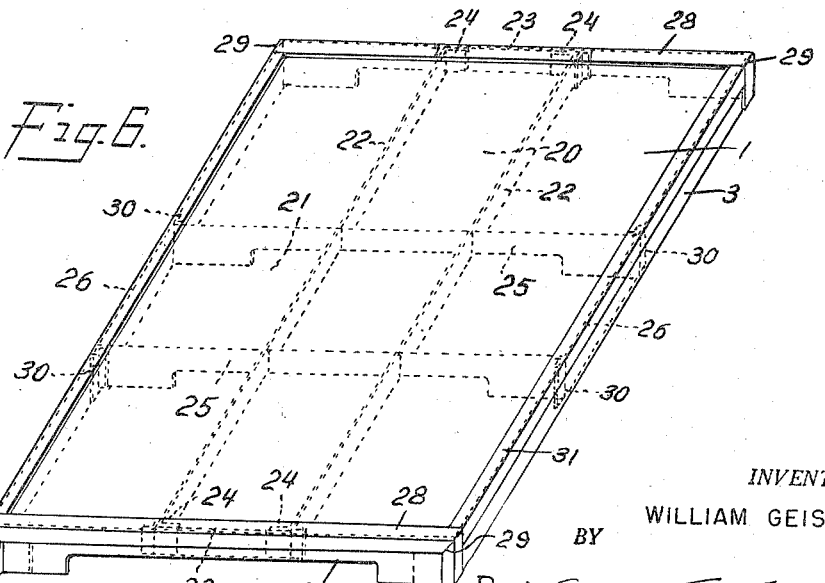
INVENTOR.
WILLIAM GEISLER
BY
Pennie, Edmonds, Morton & Barrows
ATTORNEYS United States Patent Office 2,709,559
Patented May 31, 1955

2,709,559

DISPOSABLE PALLET

William Geisler, Tenafly, N. J., assignor, by mesne assignments, to Wilbro Corporation, Hackensack, N. J., a corporation of New Jersey Application August 17, 1949, Serial No. 110,707

3 Claims. (Cl. 248—120)

This invention relates to pallets of the type used for transporting as a unit a stack of shipping containers or similar articles. Such pallets are widely used in handling cargo for transportation in ships, trains, etc., and for storage in warehouses. The conventional pallet is made of wood and consists of a platform which may be square or oblong, and is usually of three or four feet in its transverse dimensions. In its simplest form the platform consists of boards nailed to the edges of two or three 2 x 6 timbers which support the boards spaced from the ground after the manner of sled runners, to thereby provide a space for the forks of the lift truck to be projected under the platform. Pallets of this type are heavy and unwieldly as well as costly, and numerous attempts have been made to fabricate pallets of fiberboard to reduce the cost of the pallet as well as its weight, but at the present time no satisfactory fiberboard pallet has appeared on the market, and the wooden pallet is used almost universally.

The object of the present invention is to provide a pallet formed of reinforced fiberboard which is much lighter in weight than the conventional wood pallet for the same load-carrying capacity, which costs much less to fabricate, and which will withstand more impact and rough handling without damage than wooden pallets of several times the same weight.

A further object of the invention is to provide a pallet of the above description which may be fabricated of a single sheet of cut and scored fiberboard and which may be fabricated by conventional stapling machines with very little hand labor, thereby eliminating the principal item in the cost of the wooden pallets.

Other objects of the invention will appear from the following description and the accompanying drawings, wherein:

Fig. 1 is a perspective view showing the under side of the blank from which one form of my pallet is made, with the reinforcing member attached thereto;

Fig. 2 is a perspective view showing the auxiliary supporting member of the pallet;

Fig. 3 is a perspective view of the completed pallet formed from the blanks in Figs. 1 and 2;

Fig. 4 is a perspective view similar to Fig. 1 of the blank used for a modified form of my improved pallet;

Fig. 5 is a perspective view showing the auxiliary supporting members used in this form of pallet; and Fig. 6 is a perspective view of a completed pallet made from the blank shown in Fig. 4.

Referring to the drawings, particularly to Fig. 1, 1 indicates the portion of the blank constituting the top of the pallet which consists of a sheet of fiberboard of rectangular form and of the usual dimensions, for example, 3½ x 4 feet. 100-point fiberboard is preferably used for the pallet, particularly where heavy loads are to be handled.

Integral with the four marginal edges of the part 1 of the pallet are end flaps 2—2 and side flaps 3—3 which are bent at right angles to the pallet and form with the reinforcing members now to be described, the supports for the pallet which serve to space the platform 1 from the floor so that the lifting members of the lift truck by which the pallet is designed to be handled, may be projected under the load. The side flaps 3 are of rectangular shape and of a width equal to the distance that it is desired to space the platform from the floor, for instance, 3½ inches. The end flaps 2—2 have end portions 4 and a middle portion 5 which are the same width as the side flaps 3, but between these portions the flaps 2 are reduced in width to about two inches to allow openings for the forks of the lift trucks to be inserted.

The side flaps 3 have projecting tabs 6 which fold at right angles to the flaps when the latter are folded into vertical position, to thereby overlap the ends 4 of the end flaps 2 to which they are firmly fastened. I also preferably reinforce the corners of the pallet by means of corner angles 7, which may be of molded plastic, molded rubber, or compressed fiber. The angles are attached along one side to the inner face of the flap 3 and along the other side to the flaps 2 and overlapping tabs 6. The angles 7 may be attached to the flaps 3 of the flat blank as shown in Fig. 1.

For reinforcing the pallet and furnishing additional support for the platform 1, I provide vertical strips 8 extending longitudinally of the pallet from end to end, the strips being preferably composed of 100-point fiberboard or similar material, and also similar vertical strips 9 extending transversely of the pallet, that is, between the side flaps 3. The strips 8 are of the same width as the wide portions of the end flaps and the strips are attached to end flaps 2 adjacent the ends of the middle portion 5 of the end flaps. The strips are preferably formed of a single length of material bent to a rectangular shape with the ends of the strip meeting at the middle of one of the short ends 10 of the rectangle. The portions 10 may be stapled directly to the flaps 2 and I preferably also provide short reinforcing angles 11 similar to the angles 7, one side of which is either stapled or riveted to the longitudinal strips 8, while the other side of the angle is stapled or riveted to the end flaps 2. The transverse strips 9 are similarly formed of a single length of fiberboard bent to rectangular configuration. The short ends of the rectangle and the end portions of the transverse strips 9 are the full width of the side flaps 3 and the end portions are riveted or stapled to the adjacent faces of the side flaps 3. Preferably reinforcing angles 14 similar to the angles 7 are employed at the ends of the transverse members 9 to stiffen the side flaps 3 and provide additional support for the load. The mid portion of the transverse strips 9 is reduced in width at two points as indicated at 12 in the same manner as the end flaps 2 so as to provide an open space from end to end of the pallet for the forks of the lift truck.

Where the longitudinal and transverse vertical reinforcing strips 8 and 9 cross each other they are preferably connected together after the manner of the cross strips making up an ordinary cell case, that is, one pair of strips, for example, the strips 8, are notched on their upper edges at the points where they intersect the transverse strips and the transverse strips are notched on their lower edges at the point of intersection so that the two pairs of strips lock together, each pair of strips thereby holding the other against lateral displacement. Additional angles 15 may be attached as shown in Fig. 3 at the intersection of the strips.

Instead of forming the reinforcing strips of ordinary fiberboard I may, if desired, use other more rigid material, or may stiffen the fiberboard strips by impregnating the fiberboard with a suitable plastic and thereafter compressing the sheet and setting the plastic.

The above described pallet is very light, but when made with ordinary 100-point fiberboard will support a load of a thousand pounds when resting on the floor or when carried by the fork of a lift truck. The pallet has the further advantage that the platform has a smooth unbroken surface with no upstanding fastenings and no projections to splinter or tear the bags, boxes or other material when loaded onto the pallet.

While the reinforcing angles above described add considerably to the stiffness and strength of the pallet, they are not essential, particularly where light loads are to be handled.

In Figs. 4, 5 and 6 I have illustrated a modified form of my improved pallet which is of somewhat heavier construction. The blank used for this modified form of pallet is of similar shape and dimensions to the blank employed in the form above described except that the end flaps 2 as here shown have their middle portions of reduced width to allow space for the platform of lift trucks which have a single central lifting platform instead of the spaced members or forks usually provided. Instead, however, of using reinforcing strips extending from end to end and side by side of the under side of the pallet, I preferably use reinforcing members of channel cross section, one longitudinal section 20 and one transverse section 21 being preferably employed, although two or more of each may be used. The longitudinal reinforcing section consists of a strip of fiberboard having a middle portion of any desired width with marginal flanges 22 formed by scoring the fiberboard along lines parallel with the edges of the strips, the flanges being of a width equal to the width of the reduced portion of the end flaps 2. The ends of the reinforcing member are also preferably provided with narrow flaps 23 and the ends of the side flaps 22 are provided with tabs 24 similar to the side and end flaps of the main pallet. In the same way the transverse member 21 is formed with a middle platform portion and with side and end flaps 25 and 26, respectively, the side flaps having the tabs 27 which fold against the end flaps when the reinforcing members are assembled and attached to the pallet. The ends of the side flaps 25 and the end flaps 26 of the transverse members 21 are the full width of the side flaps 3 of the pallet, to thereby provide additional support for the pallet when resting on the floor.

In assembling the pallet of the type here described the end flaps 2 and the longitudinal reinforcing member 20 are preferably held in place by reinforcing angles 28 which are applied over the outer ends of the pallet when the latter is assembled. The angles 28 consist of a middle portion equal in length to the width of the pallet and two end portions equal in length to the height of the pallet. The angles are preferably formed from a continuous strip of rubber with mitres 29 cut in one side of the angle at points corresponding to the corners of the pallet when the strip is attached.

The transverse reinforcing member 21 whose side flaps are notched at points corresponding to the points of intersection with the side flaps of the longitudinal reinforcing member 20 are assembled with the reinforcing member 20 the edges of whose flaps are similarly notched as shown in Fig. 5 to form an inside reinforcing structure. This assembled structure is attached to the under side of the pallet with the horizontal portion of the transverse reinforcing member on the upper side to lie flat against the under side of the platform 1 of the pallet, while the flat portion of the longitudinal reinforcing member 20 is spaced from the under side of the pallet by a distance equal to the width of the end flaps 2 to thereby provide a flat surface to rest upon the forks or platform of the lift truck.

The blank forming the platform of the pallet with the attached end and side flaps is laid over the assembled reinforcing structure and the end flaps 2 bent down against the end flaps of the longitudinal member 20. The flaps 23, 24 and tabs 25 have previously been bent in to form flat ends for the reinforcing member against which the end flap 2 of the pallet is folded. After the end flap 2 is folded in place the angle 28 is placed over the corner at the junction of the platform 1 and the flap 2, and its unbroken side riveted or stapled to the underlying portion of the platform 1, the ends of the angle projecting out over the side flaps 3. The side flaps are then bent down with the end sections of the reinforcing angle to vertical position, the ends of the flaps 2 projecting between the side of the angle section and the tabs 6 formed on the ends of the side flaps. When so assembled the other side of the reinforcing angle is riveted or stapled to the end flap, the fastenings extending into the adjacent portions of the ends of the longitudinal reinforcing members and also through the tabs 6 of the side flaps.

After the angles 28 are applied to each end, the pallet is inverted and the reinforcing members anchored in place by riveting or stapling the ends of the reinforcing members to the adjacent portion of the flaps 2 and 3 and also, by riveting or stapling the vertical members of the parts 20 and 21 to the short angle sections 30 previously attached to the adjacent side wall of the flaps 2 and 3.

Instead of employing angle sections 30, or if desired, in addition to the angle sections 30, longitudinal corner angles 31 may be supplied along the longitudinal corners of the pallet between the end angles 28. These reinforcing angles not only have considerable strength and stiffness, but serve also to tilt the load of the pallet slightly inward so that if the load is composed of boxes or shipping cases of the same dimensions it is not necessary to interlock the boxes in stacking them on the pallet by changing the arrangement of the boxes in the several rows. Instead the boxes or shipping cases may be stacked one upon the other just in the position that they come from the case-closing machine. The cases are stacked on the pallets with the outer edge of each row of cases along the four sides of the stack resting on the rubber angles, thereby causing the upper surface of the marginal cases to all incline inwardly toward the center of the pallet. Each successive layer of cases will be inclined in the same manner so that the outer tiers of cases cannot slide or fall off the pallet, as is sometimes the case when the cases are not interlocked and are stacked one upon the other.

My improved form of pallet is somewhat heavier and requires somewhat more material than the first described pallet, but is considerably stiffer and will carry a heavier load without sagging. Also, the smooth support for the forks or platforms of the lift trucks avoids any danger of the pallet being damaged when picked up or deposited by the lift truck.

The procedure above described may be variously modified. For example, the angle sections 11 and 14 may be applied to the strips 8 and 9 out of which the intermediate support is fabricated, instead of to the under face of the blank forming the pallet. A single stapling head may advantageously be used to staple the angle sections to the strips before they are folded and assembled as shown in Fig. 2.

Instead of folding the tabs 24 of the intermediate support shown in Fig. 5 inward, as there shown, the tabs may be folded outward into the same plane as the end flaps 23 and stapled to the inner face of the flap 2. When so folded the staples used for attaching the parts together may be readily clinched, whereas this is impossible with the closed box-like structure when the flaps are folded as shown in Fig. 5. Also, the angles 30 may be attached to the flaps 22 and 25 of the parts 20 and 21 instead of to the flaps 2 and 3 of the pallet, as shown in Fig. 4.

Other changes may obviously be made without departing from the spirit of the invention or the scope of the appended claims.

I claim:

1. A pallet comprising a sheet of fiberboard having flaps at its four edges, said flaps being folded at right angles to the plane of the sheet, two opposite flaps having tabs folded against a face of the adjacent flaps at each corner of the pallet, vertical reinforcing angles of molded plastic material at the corners of the pallet, one side of said angle being attached to the overlapping flap and tab, and an intermediate support underlying said pallet, said support consisting of strips of sheet material extending from one flap to the opposite flap and vertical angles at the ends of said strips, said angles being attached to the adjacent faces of said flaps said angles being of a length equal to the width of said flaps and constituting supporting legs for said pallet.

2. A pallet comprising a sheet of fiberboard having flaps at its four edges, said flaps being folded at right angles to the plane of the sheet, an intermediate support underlying said pallet and comprising a channel-shaped section of sheet material extending from one side flap to the opposite side and connected at its ends to said flaps, the web of said channel being parallel with the plane of said pallet and the flanges of a width equal to the width of the flaps at the points of attachment, and a second channel-shaped section extending between the other two opposite flaps and similarly attached thereto.

3. A pallet comprising a sheet of fiberboard having flaps at its four edges, said flaps being folded at right angles to the plane of the sheet, an intermediate support underlying said pallet and comprising a channel-shaped section of sheet material extending from one side flap to the opposite side and connected at its ends to said flaps, the web of said channel being parallel with the plane of said pallet and the flanges of a width equal to the width of the flaps at the points of attachment, and a second channel-shaped section extending between the other two opposite flaps and similarly attached thereto, one said channel member having its flanges engaging the under side of the pallet platform, said flanges being narrower than the parallel marginal members of said pallet, whereby the web of said channel provides a lifting surface for said pallet.

References Cited in the file of this patent

UNITED STATES PATENTS

| | | | |
|---|---|---|---|
| 1,665,299 | Cushwa | Apr. 10, | 1928 |
| 2,315,105 | Bonfield | Mar. 30, | 1943 |
| 2,376,660 | Clark | May 22, | 1945 |
| 2,388,730 | Fallert | Nov. 13, | 1945 |
| 2,444,183 | Cahners | June 29, | 1948 |
| 2,496,755 | Schwartzberg | Feb. 7, | 1950 |
| 2,503,240 | Cahners | Apr. 11, | 1950 |
| 2,534,010 | Frye | Dec. 12, | 1950 |

FOREIGN PATENTS

| | | | |
|---|---|---|---|
| 39,208 | Netherlands | Oct. 15, | 1936 |